US011887755B2

(12) United States Patent
Ruppert

(10) Patent No.: US 11,887,755 B2
(45) Date of Patent: Jan. 30, 2024

(54) DEVICE FOR CONDUCTOR MARKING

(71) Applicant: Phoenix Contact GmbH & Co. KG, Blomberg (DE)

(72) Inventor: Jens Ruppert, Steinheim (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 0 days.

(21) Appl. No.: 17/798,912

(22) PCT Filed: Feb. 17, 2021

(86) PCT No.: PCT/EP2021/053866
§ 371 (c)(1),
(2) Date: Aug. 11, 2022

(87) PCT Pub. No.: WO2021/165307
PCT Pub. Date: Aug. 26, 2021

(65) Prior Publication Data

US 2023/0092385 A1 Mar. 23, 2023

(30) Foreign Application Priority Data

Feb. 17, 2020 (BE) ................................ 2020/05099

(51) Int. Cl.
*H01B 13/34* (2006.01)
*H01B 13/00* (2006.01)
*B41F 16/00* (2006.01)

(52) U.S. Cl.
CPC ....... *H01B 13/344* (2013.01); *H01B 13/0016* (2013.01); *B41F 16/008* (2013.01); *B41F 16/0046* (2013.01); *B41F 16/0086* (2013.01)

(58) Field of Classification Search
CPC . H01B 13/342; H01B 13/344; B41F 16/0046; B41F 16/008; B41F 16/0086
See application file for complete search history.

(56) References Cited

U.S. PATENT DOCUMENTS

| | | | | |
|---|---|---|---|---|
| 3,579,823 A * | 5/1971 | Gressitt | ................ | H01B 13/344 174/34 |
| 5,444,466 A | 8/1995 | Smyczek et al. | | |
| 2010/0294533 A1* | 11/2010 | Yagi | ..................... | H01B 13/345 116/201 |

FOREIGN PATENT DOCUMENTS

| | | |
|---|---|---|
| DE | 3911870 A1 | 10/1990 |
| DE | 19738485 A1 | 6/1998 |

(Continued)

OTHER PUBLICATIONS

Furusawa et al, "Water Impervious URD Cable Having Lead Foil on Conductor and on Core," in IEEE Transactions on Power Delivery, vol. 1, No. 1, pp. 51-57, Jan. 1986. (Year: 1986).*

*Primary Examiner* — A. Dexter Tugbang
(74) *Attorney, Agent, or Firm* — LEYDIG, VOIT & MAYER, LTD.

(57) ABSTRACT

A device for marking a conductor includes: a gripper for gripping the conductor extending in a longitudinal direction; a heating jaw assembly having two jaws spaced from each other in an open position in a first transverse direction transverse to the longitudinal direction; and a transport mechanism for dispensing a foil tape extending along the first transverse direction on a first side of the heating jaw assembly, a foil side of the foil tape facing away from the heating jaw assembly being weldable by heat and a foil side of the foil tape facing the heating jaw assembly including a marking of the conductor; and a gripper mechanism for moving the gripper along a second transverse direction transverse to the longitudinal direction and transverse to the first transverse direction when the heating jaw assembly is in the open position. The gripper moves the gripped conductor.

20 Claims, 16 Drawing Sheets

(56) References Cited

FOREIGN PATENT DOCUMENTS

| | | | | |
|---|---|---|---|---|
| DE | 19747663 | C2 | | 10/2002 |
| EP | 0169314 | A2 | | 1/1986 |
| GB | 845231 | A | | 8/1960 |
| JP | 2012232320 | A | * | 11/2012 |

* cited by examiner

100

124

114.3

114.3

114.3

DEVICE FOR CONDUCTOR MARKING

CROSS-REFERENCE TO PRIOR APPLICATIONS

This application is a U.S. National Phase application under 35 U.S.C. § 371 of International Application No. PCT/EP2021/053866, filed on Feb. 17, 2021, and claims benefit to Belgian Patent Application No. BE 2020/05099, filed on Feb. 17, 2020. The International Application was published in German on Aug. 26, 2021 as WO/2021/165307 under PCT Article 21(2).

FIELD

The invention relates to a device for marking a conductor.

BACKGROUND

In a switch cabinet, both ends of a conductor, for example a cable, should be marked with information such as location codes in order to clearly identify where the respective end is to be connected in the switch cabinet during setup or should be connected after a conversion. There is a range of marking solutions available for this purpose, which usually involve applying the marking manually.

In the state of the art, for example, plastic labels are widely used which are printed and manually snapped onto the cable by means of a transparent sheath. Other known labeling techniques print directly onto the conductor.

The German patent specification DE 197 47 663 C2 describes a portable device for labeling an identification plate. The patent specification DE 197 38 485 C2 also describes a process for producing an identification plate from a strip-shaped plastic material, i.e. a foil tape, which is also referred to in technical jargon as a Wiremark foil. The foil can be labeled on the upper side using thermal transfer printing. The underside comprises an adhesive layer. The foil is placed around a cable and heat is then applied by heating elements, which liquefies the adhesive of the foil at the contact point. The contact point must then be kept pressed together for a short time until the adhesive has cured again.

One disadvantage of existing marking techniques is the high manpower required for a repetitive activity, as the conductor must first be prepared (or assembled or customized) and then manually fed to and removed from the device for marking one by one.

Fully automatic devices are available for cable preparation (or cable assembly or cable customization), i.e. cutting the cables to the correct length and, if necessary, processing the cable ends. For these preparation (or assembly or customization) devices, marking modules are available that directly mark the cable ends with the aid of inkjet printers or marking lasers. Furthermore, the document U.S. Pat. No. 5,444,466 describes a combined marking and cutting, in which printing is done directly on the insulation of the conductor. A conventional marking device that prints, wraps and welds the foil tape requires more installation space than what is provided for a marking module in such preparation (or assembly or customization) devices.

Since there are already devices for the automatic preparation (or assembly or customization) of a conductor, it is desirable to have a technology that can be integrated into preparation (or assembly or customization) devices so that, in the end, a prepared (or assembled or customized cable with labeled ends can be produced fully automatically.

However, the labeling technologies that exist for devices used to prepare (or assemble or customize) a conductor have various disadvantages. For example, when printing directly on the conductor, legibility is heavily dependent on the color of the conductor. Furthermore, due to the surface curvature of the conductor, the typeface is often blurred or unclean, for example in inkjet printing. Other printing techniques, such as laser marking, are not applicable to every conductor. Direct marking of the conductor also has the disadvantage that the printed information is lost if the conductor is shortened. Also, the orientation of the print cannot be changed and the labeling depends on the sheath material of the conductor.

The aforementioned Wiremark technology is indeed superior to direct printing on the conductor in terms of the marking result. However, no corresponding module exists that could be integrated into a device used to prepare (or assemble or customize) a conductor.

SUMMARY

In an embodiment, the present invention provides a device for marking a conductor, comprising: a gripper configured to grip the conductor extending in a longitudinal direction; a heating jaw assembly having two jaws spaced from each other in an open position in a first transverse direction transverse to the longitudinal direction; and a transport mechanism for dispensing a foil tape extending along the first transverse direction on a first side of the heating jaw assembly, a foil side of the foil tape facing away from the heating jaw assembly being weldable by heat and a foil side of the foil tape facing the heating jaw assembly comprising a marking of the conductor; and a gripper mechanism configured to move the gripper along a second transverse direction transverse to the longitudinal direction and transverse to the first transverse direction when the heating jaw assembly is in the open position, wherein the gripper is configured to move the gripped conductor from the first side of the heating jaw assembly through between the two jaws while entraining the foil tape abutting the conductor to a second side of the heating jaw assembly, the second side being opposite the first side, wherein the two jaws in a closed position are configured to exert pressure on each other in the first transverse direction and to emit heat, and wherein portions of the weldable foil side of the foil tape are brought into abutment with each other or configured to abut each other under a pressure of the jaws and a heat of the jaws welds or is configured to weld portions for arranging the foil tape having the marking around the conductor in a circumferentially closed manner.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
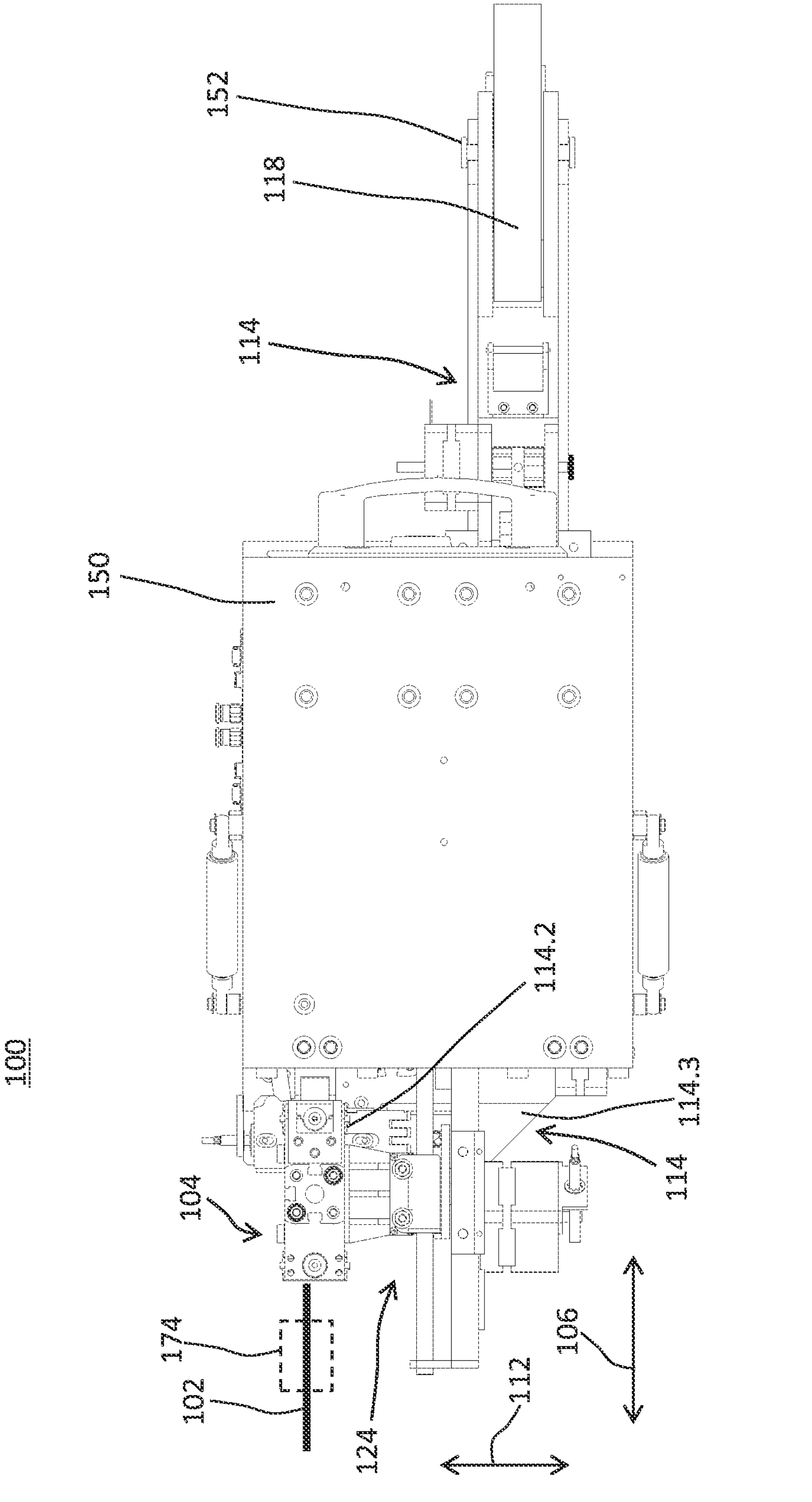
FIG. 1 a top view of an embodiment of a device for marking a conductor.

In an embodiment, the present invention provides a technique for marking a conductor which can be integrated into a device used to prepare (or assemble or customize) a conductor. An embodiment provides a technique for marking a conductor in a wrinkle-free and tight-fitting manner.

Embodiments of the invention are described below, partly with reference to the figures.

As to one aspect, a device for marking a conductor comprises a gripper configured to grip (for example, to hold) the conductor extending in a longitudinal direction. Further, the device comprises a heating jaw assembly having two jaws. In an open position, the jaws are spaced apart from each other in a first transverse direction transverse to the longitudinal direction. Further, the device comprises a transport mechanism for dispensing a foil tape extending along the first transverse direction on a first side of the heating jaw assembly. A foil side of the foil tape facing away from the heating jaw assembly is weldable by heat. A foil side of the foil tape facing the heating jaw assembly comprises the marking of the conductor. Further, the device comprises a gripper mechanism configured to move the gripper along a second transverse direction transverse to the longitudinal direction and transverse to the first transverse direction when the heating jaw assembly is in the open position, wherein the gripper moves the gripped conductor from the first side of the heating jaw assembly between the two jaws while entraining the foil tape adjacent to the conductor to a second side of the heating jaw assembly, the second side being opposite the first side. In a closed position, the two jaws are configured to exert pressure on each other in the first transverse direction and to emit heat, wherein sections of the weldable foil side of the foil tape are in contact, or configured to be brought into contact, with each other under the pressure of the jaws, and the heat of the jaws welds, or is configured to weld, the sections for arranging the foil tape comprising the marking around the conductor in a circumferentially closed manner.

By the gripper moving the conductor between the two jaws while entraining the foil tape adjacent to (or abutting) the conductor onto a second side of the heating jaw assembly, opposite the first side, embodiments of the device may wrap the foil tape around the conductor by means of the heating jaws themselves, so that by the subsequent closing of the heating jaw assembly, the foil tape wrapped around the conductor is welded abutting tightly against the conductor without wrinkles or unevenness. Same or further embodiments of the device may be integrable into a device for preparing (or assembling or customizing) the conductor, for example due to the compact design of the device and/or without an additional mechanism for folding or wrapping of the foil tape.

Herein, "gripping" (or "to grip") may be realized by "holding gripped" (or "to hold gripped").

Herein, the "conductor" may be an electrical conductor and/or an electromagnetic conductor, for example an optical conductor. The conductor may be configured to conduct electrical charge, an electrical current, an electrical voltage, and/or light. The conductor may comprise one or a plurality of insulations. The conductor may comprise one core or a plurality of cores insulated from each other, each configured for electrical and/or electromagnetic, for example optical, conduction.

The marking may be arranged or arrangeable in a closed circumferential manner around the insulation.

The device may comprise one or more control systems configured to control or regulate any step or method or function disclosed herein. For example, the device may comprise one or plurality of actuators, which is or are controlled or driven by the one or more control systems and which is or are configured to drive any motion disclosed herein (for example, motion of the gripper mechanism or the transport mechanism).

Further, the device may comprise one or more sensors. The one or more sensors may be in signal connection with the one or more control systems for detecting states and/or positions (for example, of the gripper mechanics or the transport mechanics) and/or for measuring positions and/or quantities (for example, of the conductor).

The device may comprise a sensor for measuring a diameter or circumference of the conductor (for example, including insulation of the conductor). The control system may be configured to control an actuator of the transport mechanism to output the foil tape extending along the first transverse direction on the first side of the heating jaw assembly to minimize or avoid misalignment of the welded sections and/or (for example, in the case of a cut subsequent to welding) to minimize or avoid a cut residue. For example, a feed of the foil tape may be proportional to the measured circumference or diameter of the conductor.

The longitudinal direction and/or the first transverse direction may be horizontal (i.e., transverse or perpendicular to gravity). The second transverse direction may be vertical (i.e. parallel to gravity).

The gripper mechanism may be configured to move the gripper from a first position in which the conductor gripped by the gripper is arranged on the first side of the heating jaw assembly (preferably while the foil tape on the first side of the heating jaw assembly extends in the first transverse direction between the conductor and the heating jaw assembly) to a second position in which the conductor gripped by the gripper is arranged on a second side of the heating jaw assembly opposite the first side.

In the first position, the conductor gripped by means of the gripper may be arranged on the first side of the heating jaw assembly in alignment with a gap between the two jaws in the open position of the heating jaw assembly.

The transport mechanism may be configured to provide the foil tape in a plane parallel to the longitudinal direction and parallel to the first transverse direction. A width of the foil tape (i.e., a size of the foil tape in the longitudinal direction) may be less than or equal to a width of the jaws in the longitudinal direction.

The device may be built into or integrable into a device for preparing (or assembling or customizing) the conductor.

The gripper may comprise a first gripping section and a second gripping section spaced apart from the first gripping section in the longitudinal direction of the conductor. Each of the gripping sections may be configured to grip the conductor transversely to the longitudinal direction of the conductor.

The gripper may also be referred to as a double gripper. Optionally, the gripper may further be configured to clamp the conductor between the first gripping section and the second gripping section.

Gripping transverse to the longitudinal direction of the conductor may be referred to as radial gripping (for example, with respect to a cylindrical conductor). The gripper may be a radial gripper.

The gripper may comprise two gripper fingers that are movable relative to each other, preferably one pair of gripper fingers at each gripping section. Each of the gripping sections may comprise the ends (also: fork ends) of two gripper fingers of different forks. The gripper fingers may extend in the second transverse direction. Alternatively or additionally, the fork ends may be movable in the first transverse direction upon or due to the pivotal motion of the forks.

The gripper mechanism may move the gripped conductor from the first side to the second side of the heating jaw assembly by moving the first gripping section and the second gripping section past opposite sides of the jaws.

The distance between the first gripping section and the second gripping section may be greater than a width of the heating jaw assembly in the longitudinal direction. The gripper mechanism for the motion of the gripped conductor from the first side of the heating jaw assembly to the second side of the heating jaw assembly may pass the first gripping section and the second gripping section outside the heating jaw assembly on opposite sides of the heating jaw assembly, respectively.

The device may further comprise a support spring arranged on the second side of the heating jaw assembly to press the foil tape wrapped around the conductor against the conductor.

The support spring may be arranged in the first transverse direction centered on the two jaws and/or in the second transverse direction on the second side outside of the heating jaw assembly.

The foil tape carried by the conductor may be wrapped around the conductor. The sections of the foil tape welded by means of the jaws may be opposite ends of the foil tape wrapped around the conductor. By means of the support spring, the foil tape entrained or carried along may rest against or abut the conductor on a side of the conductor facing away from the heating jaw assembly.

The gripper mechanism may comprise a mechanical guide configured to guide the gripper in a plane that is parallel to the longitudinal direction and the second transverse direction, and/or that is perpendicular to the first transverse direction.

The mechanical guide may comprise a first linear guide parallel to the longitudinal direction and a second linear guide parallel to the second transverse direction carried by the first linear guide, or the mechanical guide may comprise a first linear guide parallel to the second transverse direction and a second linear guide parallel to the longitudinal direction carried by the first linear guide. The mechanical guide may further comprise a motion guide and/or an actuator of the gripper mechanism.

The gripper mechanism may comprise a motion guide configured to determine a path of the gripper, preferably in-plane. The path may comprise or include at least one of the following three motions (preferably in a time sequence corresponding to the naming). A first motion of the gripper may be along the second transverse direction away from the heating jaw assembly. A second motion of the gripper may be along the longitudinal direction toward the heating jaw assembly. A third motion of the gripper may be along the second transverse direction toward the heating jaw assembly. The third motion may be or comprise the motion wherein the gripper moves the gripped conductor from the first side of the heating jaw assembly between the two jaws to the second side of the heating jaw assembly in the open position of the heating jaw assembly.

The path may be U-shaped. For example, with the second transverse direction vertical, the path may correspond to an upside-down U. A length of the path section of the first motion may be the same as a length of the path section of the third motion.

In the first motion, the gripped conductor may be spaced in the longitudinal direction from the heating jaw assembly. In the second motion, the gripped conductor may be spaced from the heating jaw assembly in the second transverse direction. In the third motion, a portion of the gripped conductor may be arranged between the first gripping section and the second gripping section within the heating jaw assembly and/or contact the foil tape.

Preferably, during the sequence of movements (i.e. along the path) and/or its reversal (i.e. along the return path), the conductor is not released, not received and/or not transferred. Preferably, the gripper (for example, at all gripping sections or all gripper fingers) remains closed at all times during this phase, i.e., the gripper does not release the conductor.

The first gripping section of the gripper may be mounted for movement in the longitudinal direction, preferably for pivoting movement. The first gripping section of the gripper may comprise a first run-up slant (or first approach slant). The device may further comprise a (for example stationary) second run-up slant (or second approach slant) arranged to interact with the first run-up slant, preferably for motion of the first gripping section in the longitudinal direction away from the second gripping section when the gripper moves the gripped conductor from the first side of the heating jaw assembly between the two jaws to the second side of the heating jaw assembly in the open position of the heating jaw assembly. The second run-up slant may be arranged to interact with the first run-up slant in the third motion of the gripper along the second transverse direction.

The motion of the first gripping section in the longitudinal direction away from the second gripping section may allow for tensioning or re-tensioning of the conductor between the first gripping section and the second gripping section. Alternatively or additionally, the motion of the first gripping section in the longitudinal direction away from the second gripping section may allow the gripped conductor to remain straight or taut as the gripper moves the gripped conductor from the first side of the heating jaw assembly between the two jaws to the second side of the heating jaw assembly in the open position of the heating jaw assembly. Deflection of the conductor pressed against the foil tape may thereby be reduced or prevented. For example, the marking may thereby lie wrinkle-free (or unrumpled) or tightly against the conductor.

The first run-up slant may extend diagonally in a plane spanned by the second transverse direction and the longitudinal direction. The first run-up slant may include an acute angle with the second transverse direction, preferably an angle of from 10° to 45°, for example from 20° to 30°.

The second run-up slant may be stationary (for example, fixed or resilient) arranged on the device. For example, the second run-up slant may be stationary (for example, fixed or resilient) with respect to the transport mechanism.

The second run-up slant may extend diagonally in a plane spanned by the second transverse direction and the longitudinal direction. The second run-up slant may be parallel to the first run-up slant. Alternatively or additionally, the second run-up slant may include an acute angle with the second transverse direction, preferably an angle in the range from 10° to 45°, for example from 20° to 30°.

The gripper may be configured to pick up the conductor to be marked, preferably by means of a control system and/or an actuator of the gripper mechanism, before the motion sequence and/or before the first motion, preferably to receive the conductor from another gripper. Alternatively or additionally, the gripper may be configured to, preferably by means of the control system and/or the actuator of the gripper mechanism, run through the path in reversal of the motion sequence after the motion sequence and/or release the marked conductor after reversal of the first motion, preferably to transfer it to the further gripper.

The further gripper may be linearly movable in the first transverse direction, for example between an output location of a device for conductor preparation (or conductor assembly or conductor customization) and a pick-up location (or receiving location) and/or output location of the device for marking the conductor. The conductor to be marked may be provided at the output location of the device for conductor preparation (or conductor assembly or conductor customization). The control system of the device may be configured to control the further gripper for picking up the conductor provided at the output location of the device for conductor preparation (or conductor assembly or conductor customization), for moving the conductor to the pick-up location of the device for marking the conductor and for transferring the conductor to the gripper, for example before the sequence of movements and/or before the first movement of the gripper. At the pick-up location of the device for marking the conductor, the sequence of movements of the gripper may start. At the output location of the device for marking the conductor, the reversal of the sequence of movements of the gripper may end.

The device may further comprise a cutting unit arranged on the first side of the heating jaw assembly to cut the welded sections flush.

The cutting unit may comprise a cutting blade. The blade may be longitudinally movable or pivotally movable along the first transverse direction and/or the longitudinal direction. The blade may be pivotally arranged about a pivot axis parallel to the second transverse direction.

The transport mechanism of the foil tape may further comprise a deflection unit. The deflection unit may be configured to deflect a direction of movement of the foil tape from the longitudinal direction to the first transverse direction without kinking and/or distortion.

The deflection unit may be configured to deflect the (preferably printed) foil tape, starting from the longitudinal direction in the second transverse direction (for example upwards) and then in an arc in the first transverse direction (for example horizontally to the right as seen in the longitudinal direction).

The foil tape transport mechanism may further comprise a deflection unit having a guide channel. The guide channel may be curved in a first curved section from a first plane or first level, which is parallel to the longitudinal direction and the first transverse direction, into the second transverse direction. The guide channel may further lead to or open into a second curved portion into a second plane or second level that is parallel to the first plane and offset in the second transverse direction.

The guide channel may be continuous and/or smooth from the first section to the second section. In the second plane or at the second level of the guide channel, the foil tape may be dispensed to the first side of the heating jaw assembly along the first transverse direction.

For example, the foil tape extends in a guide channel that curves upwardly in a first curved portion from a first horizontal plane, and that opens into a second horizontal plane in a second curved portion, wherein the first horizontal plane is lower than the second horizontal plane, and wherein the foil tape extends from back to front in the first horizontal plane and extends from right to left in the second horizontal plane.

The printed top side of the foil tape in the first horizontal plane is the bottom side in the second horizontal plane.

The device may further comprise a printer, preferably a thermal transfer printer. The printer may be arranged along the transport mechanism between an unwinder of the foil tape and the deflection unit, for example arranged to print the marking of the conductor on the foil side of the foil tape facing the heating jaw assembly.

The gripper may comprise two gripper fingers at the first gripping section and/or the second gripping section, each of which is pivotable about a common pivot axis. The common pivot axis may be parallel to the longitudinal direction.

The gripper may further comprise a driver or entrainer that is linearly movable (preferably in a cylinder) at the first gripping section and/or the second gripping section (for example, in each case). The linear movement of the driver or entrainer and/or an axis of the cylinder may be parallel to the second transverse direction. The driver or entrainer may comprise two oblong holes. An orientation of the oblong holes may extend predominantly in the first transverse direction. In each of the oblong holes, a pin of one of the gripper fingers may be arranged to convert the linear motion of the driver or entrainer into the pivoting motion of the gripper fingers. The pin of the respective gripper finger may be integral with the respective gripper finger.

Alternatively or additionally, the gripper may comprise a Bowden cable at the first gripping section and/or the second gripping section (for example, in each case). The Bowden cable may comprise a pulling cable and a cable housing that longitudinally movably accommodates the pulling cable and is pressure-resistant in the direction of motion of the pulling cable. One end of the pulling cable may be connected to the driver or entrainer in a tension-resistant manner. The cable housing is supported (preferably in a pressure-resistant manner) on the cylinder.

The driver or entrainer may be pretensioned or biased by means of a return spring, for example against a pulling direction of the pulling cable and/or in the direction of a closed position of the gripper fingers. The return spring may be arranged in the cylinder. The pulling cable may extend inside the return spring.

The driver or entrainer may be arranged longitudinally movable in the cylinder. Alternatively or additionally, the driver or entrainer may be pretensioned or biased in the direction of a closed position of the gripper fingers, for example by means of the return spring, which is preferably arranged coaxially in the cylinder and/or extends in the second transverse direction.

An angle between a trajectory of one or each pin and the orientation of the (for example respective) oblong hole may be between 30° and 60°, preferably about 45°, in an open position of the gripper fingers. Alternatively or additionally, an angle between the trajectory of one or each pin and the orientation of the (for example respective) oblong hole in a closed position of the gripper fingers may be between 80° and 100°, preferably 90°.

Figure 3:
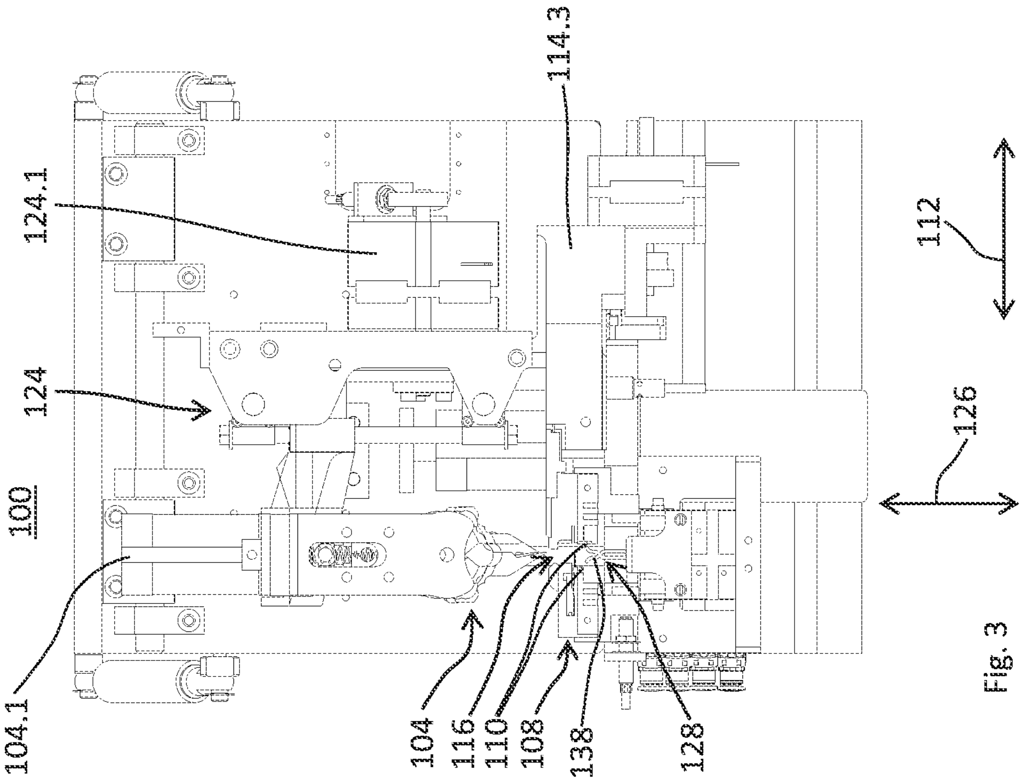
FIG. 3 a side view from the side of a conductor feed of the embodiment of the device for marking the conductor.
Figure 2:
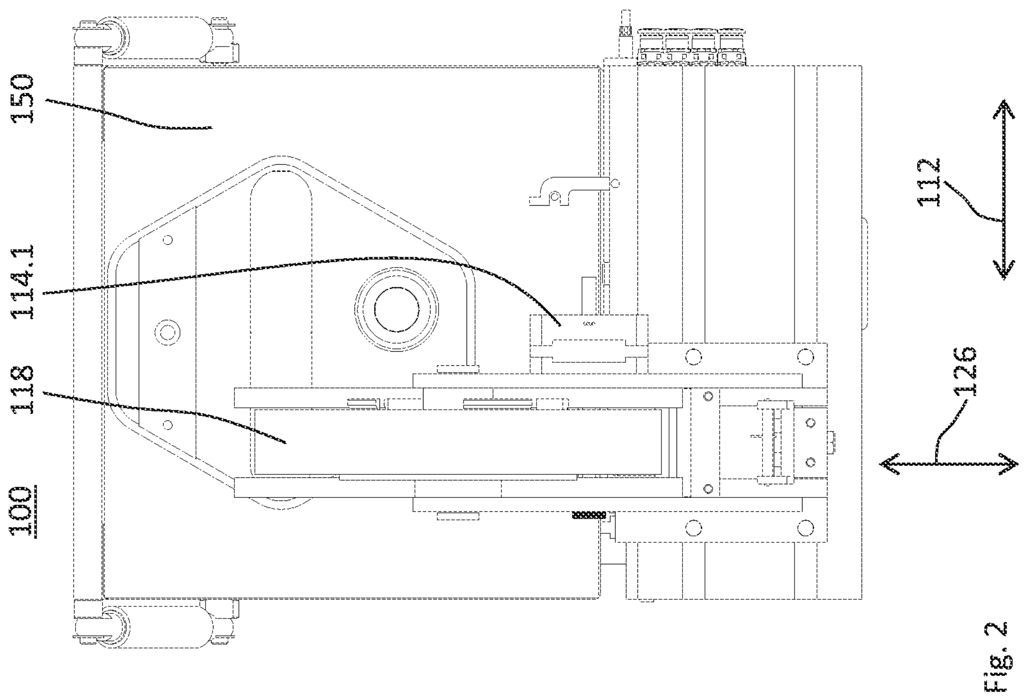
FIG. 2 a side view from the side of a foil feeder of the embodiment of the device for marking the conductor.
Figure 4:
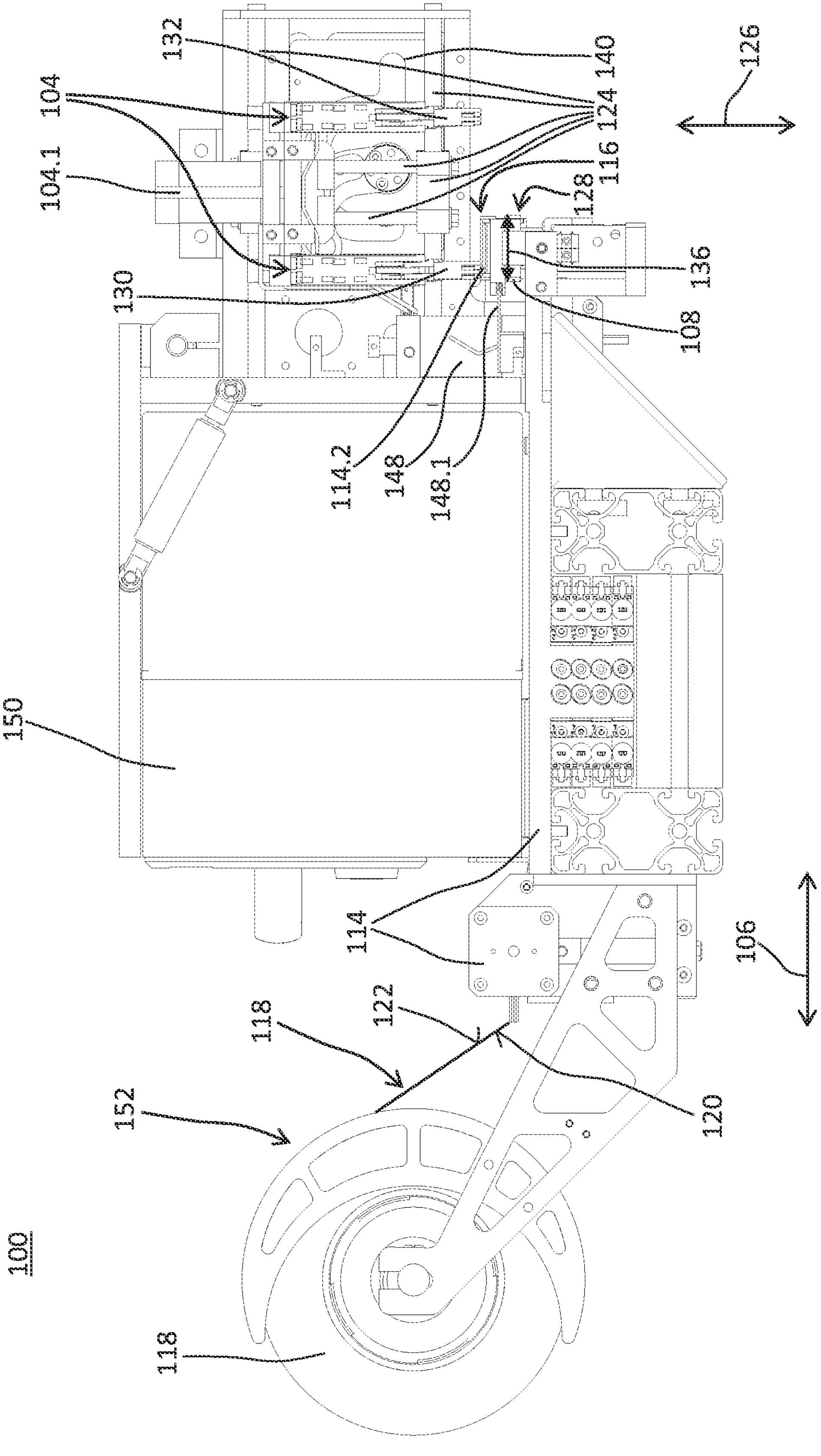
FIG. 4 a front view of the embodiment of the device for marking the conductor.

FIG. 1 shows an embodiment of a device for marking a conductor 102 in a plan view, which device is generally designated by reference numeral 100. FIG. 2 shows a side view of the embodiment of the device 100 from the side of a foil feed of the device 100. FIG. 3 shows a side view from the side of a conductor feed of the device 100. FIG. 4 shows a front view of the device 100.

The device 100 comprises a gripper 104 configured to grip the conductor 102 extending in a longitudinal direction 106. A heating jaw assembly 108 of the device 100 comprises two jaws 110 spaced from each other in an open position in a first transverse direction 112 transverse to the longitudinal direction 106.

Further, the device 100 comprises a transport mechanism 114 for dispensing 114.2 a foil tape 118 extending along the first transverse direction 112 on a first side 116 of the heating jaw assembly 108.

In addition to the output 114.2, the transport mechanism 114 comprises a first actuator 114.1 shown in FIG. 2, which drives the motion of the foil tape 118, and a deflection unit 114.3 arranged in the transport direction between the actuator 114.1 and the output 114.2. A second actuator 114.4 is further arranged on the deflection unit 114.3 for moving the foil tape 118.

A foil side 120 of the foil tape 118 facing away from the heating jaw assembly 108 is weldable by heat. A foil side 122 of the foil tape 118 facing the heating jaw assembly 108 comprises the marking of the conductor 102.

For this purpose, the device 100 comprises a printer 150, preferably a thermal transfer printer. The printer 150 is arranged along the transport mechanism 114 between an unwinder 152 of the foil tape 118 and the deflection unit 114.3 for printing the foil side 122 of the foil tape 118 facing the heating jaw assembly 108 with the marking for the conductor 102.

Further, the device 100 comprises a gripper mechanism 124 configured to move the gripper 104 along a second transverse direction 126 transverse to the longitudinal direction 106 and transverse to the first transverse direction 112 when the heating jaw assembly 108 is in the open position.

During this motion (for example, during the aforementioned third motion), the gripper 104 moves the gripped conductor 102 from the first side 116 of the heating jaw assembly 108, between the two jaws 110, while entraining the foil tape 118 adjacent the conductor 102, to a second side 128 of the heating jaw assembly 108 opposite the first side 116.

The two jaws 110 are longitudinally movable between the open position and a closed position. In the closed position, the jaws 110 are configured to exert pressure on each other in the first transverse direction 112 and to emit heat, whereby the sections of the weldable foil side 120 of the foil tape wrapped around the conductor 102 disposed between the jaws 110 are in contact with each other under the pressure of the jaws 110 and the heat of the jaws 110 welds the sections together. This produces a circumferentially closed arrangement of the foil tape comprising the marking around the conductor 102.

Embodiments of the device 100 may be integrated into a device for preparing (or assembling or customizing) the conductor 102 (for example, a machine for automatically preparing or assembling or customizing cables). For integration, another gripper 174 may be provided that is linearly movable in the first transverse direction 112 between an output location of the device for preparing (or assembling or customizing) and a receiving location of the device 100 for receiving the prepared (or assembled or customized) conductor 102.

It is of particular advantage that, due to the deflection unit 114.3, the printer 150 does not block the path between the output location of the device for preparing (or assembling or customizing) and the pick-up location of the device 100 or extend it by the length of the printer 150 and the unwinder 152.

An embodiment (for example, the embodiment shown) of the device 100 uses an existing Wiremark foil as the foil tape 118. The embodiment of the device 100 comprises the unwinder 152 as the support for the foil tape 118, a thermal transfer printer 150, the transport mechanism 114 for guiding and redirecting the foil tape 118, the gripper 164, and the heating jaw assembly 108 as the welding unit, which further comprise the support surfaces for wrapping the foil tape 118.

Preferably, the device 100 further comprises a cutting unit 148 (or severing blade) and an associated actuator 148.1 that pivots the severing blade about a pivot axis parallel to the second transverse direction 126.

Embodiments of the device 100 may particularly minimize the width of the installation space of the device 100 in the first transverse direction 112. The narrow width is important so that the device 100 may be used on or in a variety of different devices for fabrication, thereby taking up as little space as possible. This is why the printer 150 may not be placed directly adjacent to the heating jaw assembly 108 as the welding unit. The foil tape 118 must therefore be deflected by 90°. The deflection unit 114.3 is designed for this purpose.

The conductor 102 to be labeled (for example, the cable to be labeled) is held by the gripper 104 at two gripping sections 130 and 132 and pressed against the foil tape 118, which thereby wraps around the conductor 102. The distance 134 between the first gripping section 130 and the second gripping section 132 of the gripper 104 shown in FIG. 4 is greater than the width 136 of the heating jaw assembly 108 in the longitudinal direction 106, so that the gripper 104 does not block the motion of the jaws 110 from the open position to the closed position. Rather, in the closed position, the conductor 102 is gripped at the first gripping section 130 and the second gripping section 132 outside of the heating jaw assembly 108.

A resilient element 138 is located below the conductor 102, for example at the aforementioned second side of the heating jaw assembly 108. The resilient element 138 is a resilient element configured to tightly wrap the foil 118 around the conductor 102.

Embodiments of the device 100 may advantageously provide the ability to determine an interference fit of the foil 118, i.e., the marking, on the conductor 102 by specifying a parameter, as compared to existing tabletop Wiremark technology devices. For example, the parameter may be transmitted or input to the control system via a data interface or keypad of the device 100.

For example, in the existing table-top device, the foil is folded before being folded around the conductor so as to obtain a flat labeling surface, but as a result the foil is not tightly or circumferentially applied to the conductor. Embodiments of the device 100 for marking place the foil 118 around the conductor 102, for example in distinction to the double folded marking according to the patent specification DE 197 38 485 C2.

The welding jaws 110 close and weld the foil tape 118. Preferably, each of the jaws 110 comprises a welding ceramic. The welding ceramic may be pendulum-mounted so that the surfaces of the jaws 110 align parallel to each other by themselves.

In a first variant of the device 100 (for example, a first variant of the embodiment), the control system allows the welding jaws 110 to cool in a contracted manner (i.e., in the closed position) to hold the foil tape 118 together during the adhesive cooling process.

In a second embodiment of the device 100 (for example, a second variant of the embodiment), the control system keeps the welding jaws 110 permanently at temperature (for example, a temperature above the melting point of the adhesive). The jaws 110 close only briefly to liquefy the adhesive of the weldable foil side 120. The jaws 110 then immediately retract. A resilient element is arranged on each heating jaw 110, which presses the sections of the foil tape 118 together in the center, even if the welding jaws 110 have already moved to open slightly.

The second variant may reduce a cycle time compared to the first variant.

With sufficiently small masses of the jaws 110 to be heated and/or heating elements integrated directly into the surfaces of the jaws 110, the first variant may achieve comparable cycle times with less design effort.

The cutting blade 148 is then extended or driven out to cut through the foil tape. The cutting blade 148 is pushed through the foil tape at an angle to ensure even wear of the blade.

Figure 6:
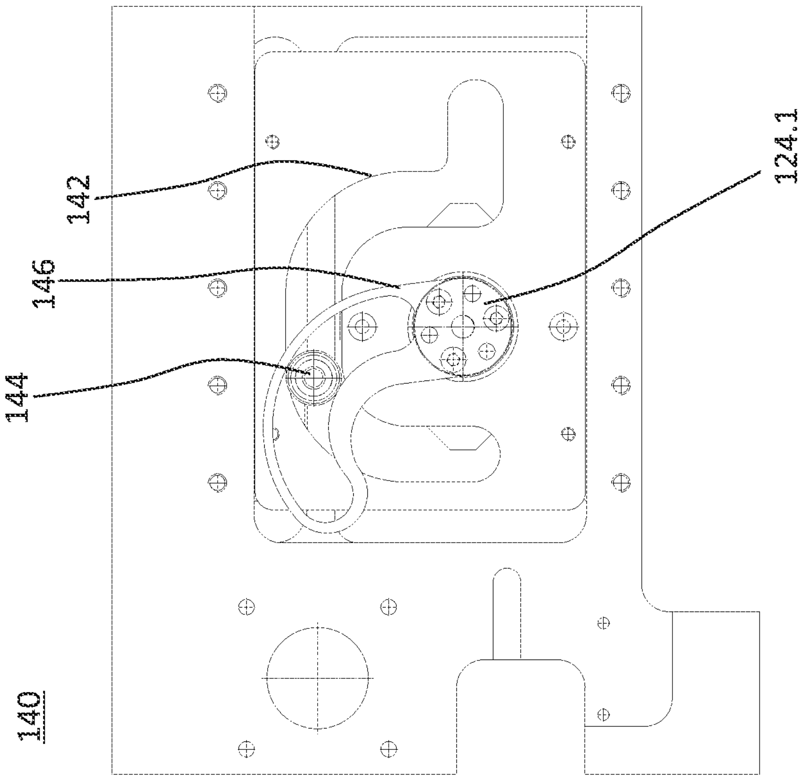
FIG. 6 a front view of the embodiment of the motion guide of FIG. 5.
Figure 5:
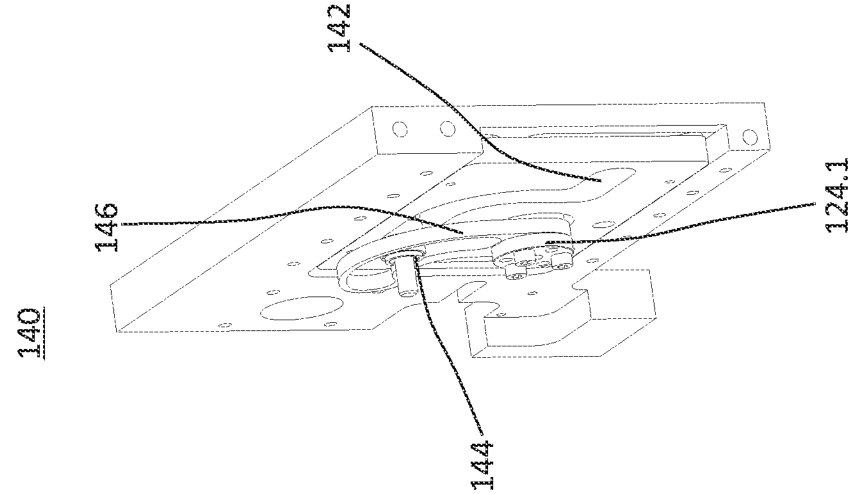
FIG. 5 a perspective view of an embodiment of a motion guide of a gripper mechanism that may be applicable to any embodiment of the device.

FIGS. 5 and 6 show a motion guide 140 that defines the path of motion or travel of the gripper 104 in a plane. The motion guide 140 comprises a guide groove 142 and a roller 144, which transmits the path of the guide groove to the gripper mechanism 124. An actuator 124.1 of the gripper mechanism 124 drives the motion sequence via a pivot drive 146 of the motion guide 140.

Figure 9:
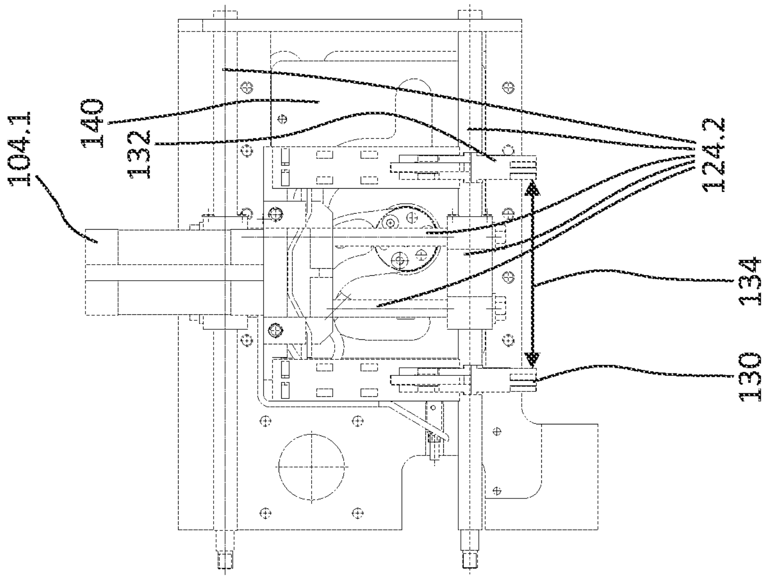
FIG. 9 a front view of the embodiment of the gripper and the gripper mechanism of FIG. 7.
Figure 8:
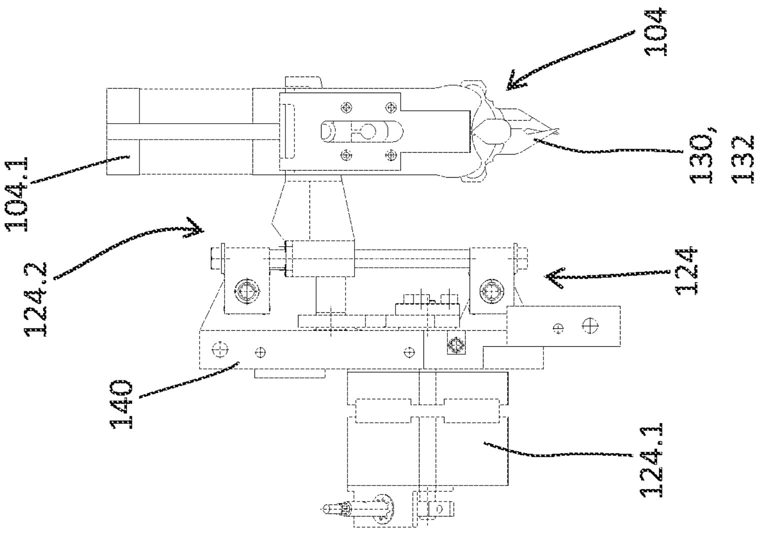
FIG. 8 a side view of the embodiment of the gripper and the gripper mechanism of FIG. 7.
Figure 7:
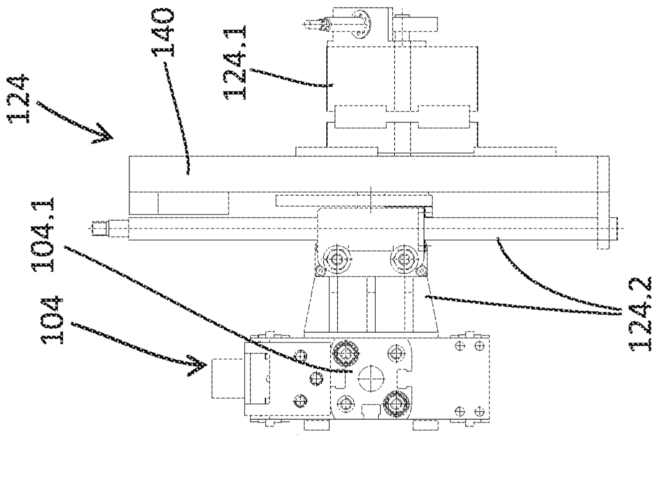
FIG. 7 a top view of an embodiment of a gripper and the gripper mechanism that may be applicable to any embodiment of the device.

FIG. 7 shows a top view of an embodiment of a gripper 104 and the gripper mechanism 124, which may be applicable to any embodiment of the device 100. Accordingly, FIGS. 8 and 9 show a side view and a front view, respectively, of the embodiment of the gripper and the gripper mechanism of FIG. 7.

The gripper mechanism 124 comprises the actuator 124.1 and a guide 124.2 of the gripper mechanism 124 in one plane.

Figure 10:
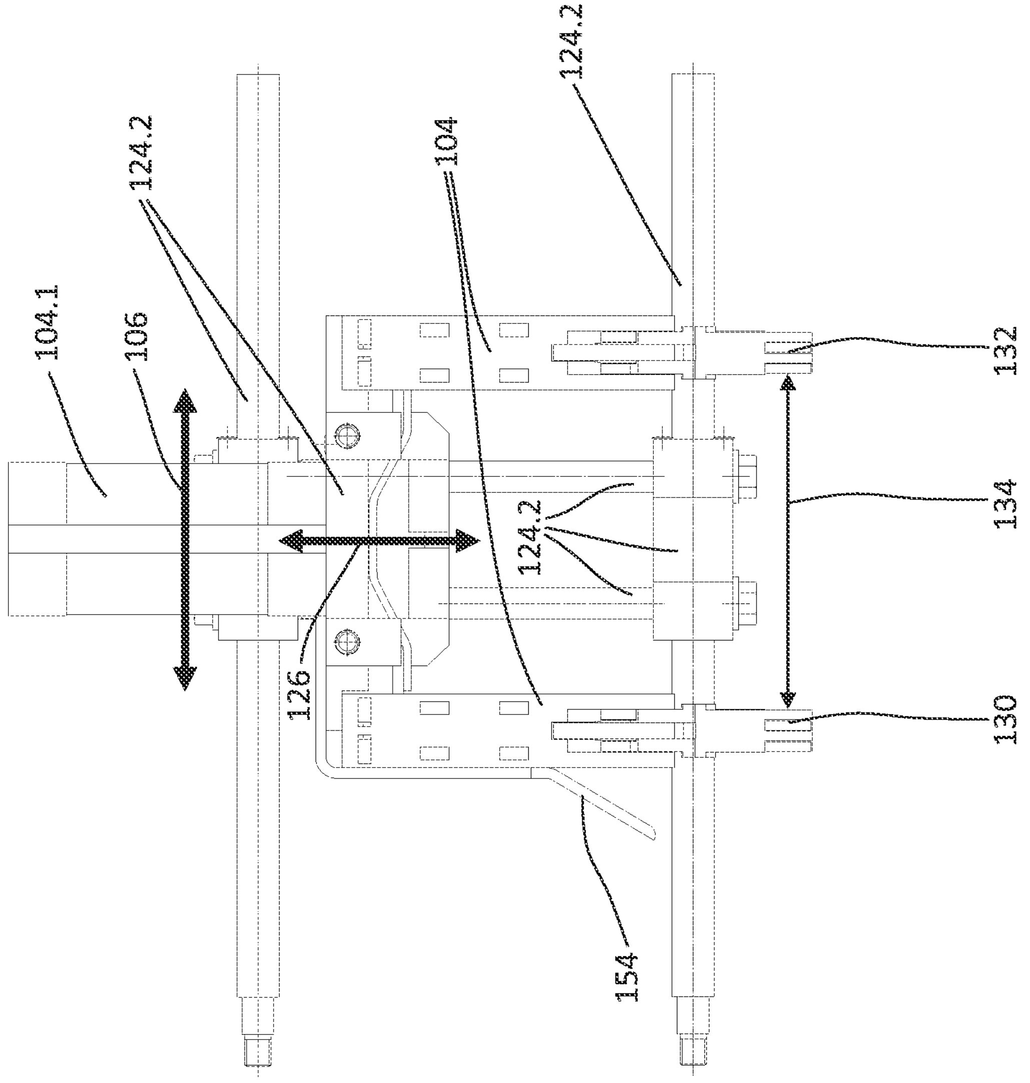
FIG. 10 a front view of an embodiment of a gripper and a guide of the gripper mechanism, which may be applicable to any embodiment of the device.

FIG. 10 shows a front view of an embodiment of the gripper 104 and the guide 124.2 of the gripper mechanism 124, which may be applicable in any embodiment of the device 100. The guide 124.2 comprises two linear degrees of freedom in the longitudinal direction 106 and the second transverse direction 126. Within this plane, the guide groove 142 of the motion guide determines the path of the gripper 104.

Figure 13:
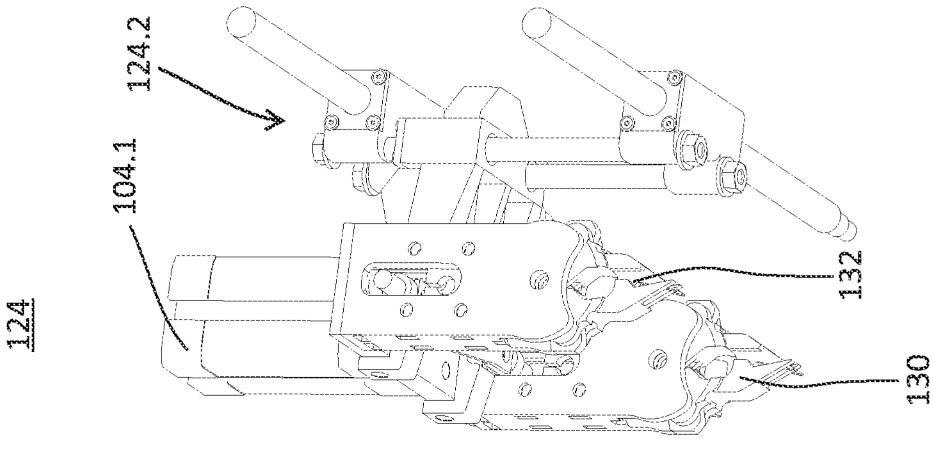
FIGS. 11 to 13 views of the embodiment of the gripper and the guide of the gripper mechanism of FIG. 10 from different perspectives.
Figure 12:
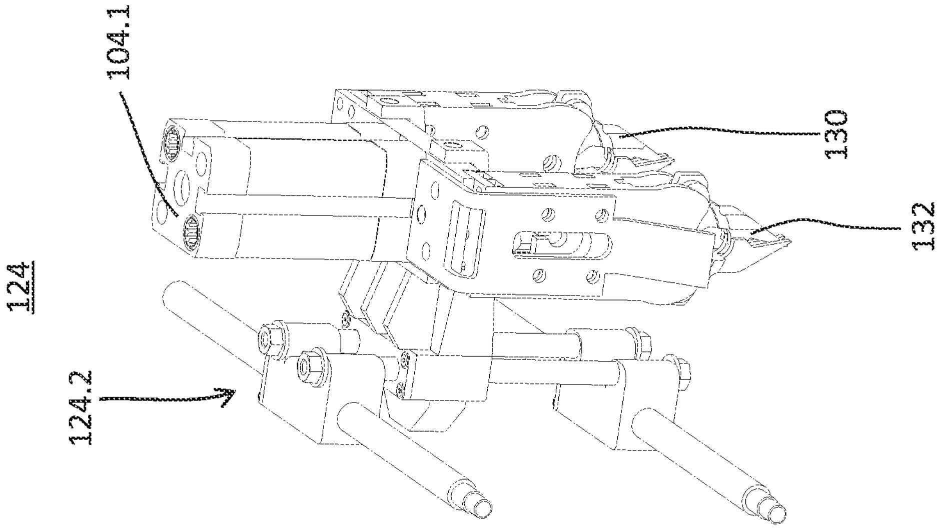
Figure 11:
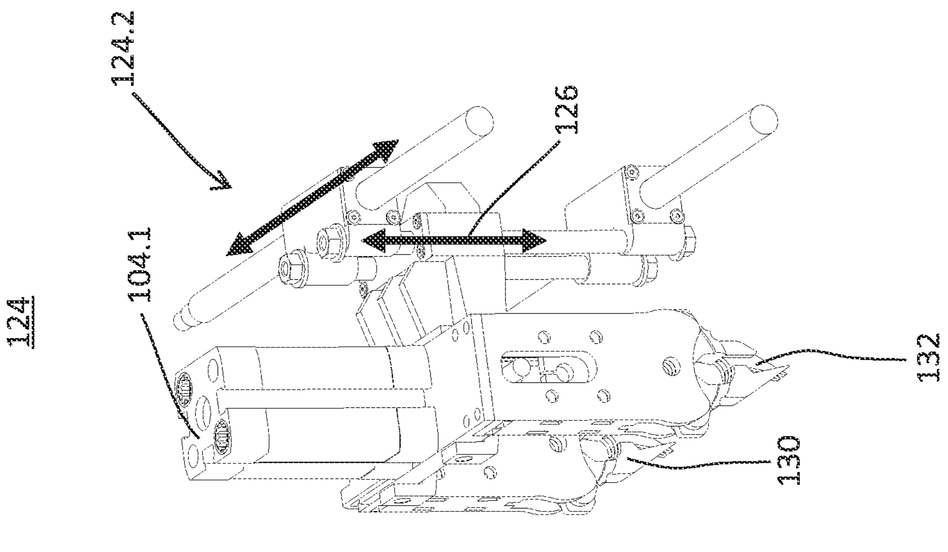

FIGS. 11 to 13 show views of the embodiment of the gripper 104 and the guide 124.2 of the gripper mechanism 124 of FIG. 10 from different perspectives. Shown therein are the two degrees of freedom of the guide 124.2 and the actuator 104.1 of the gripper 104.

Figure 14:
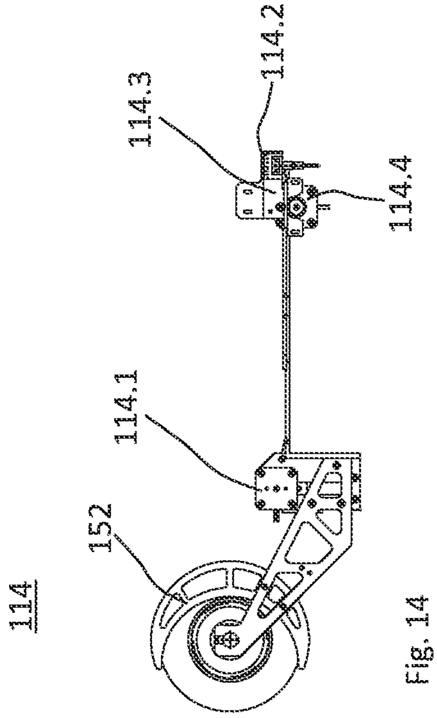
FIG. 14 a front view of an embodiment of a transport mechanism of the foil tape with deflection unit, which may be applicable in any embodiment of the device.
Figure 15:
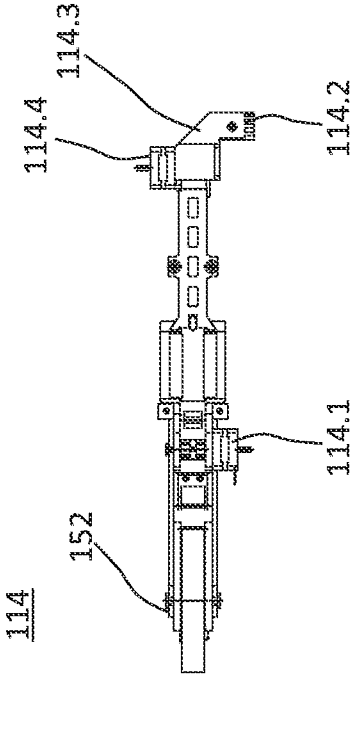
FIG. 15 a top view of the embodiment of the transport mechanism of the foil tape with deflection unit of FIG. 14.
Figure 16:
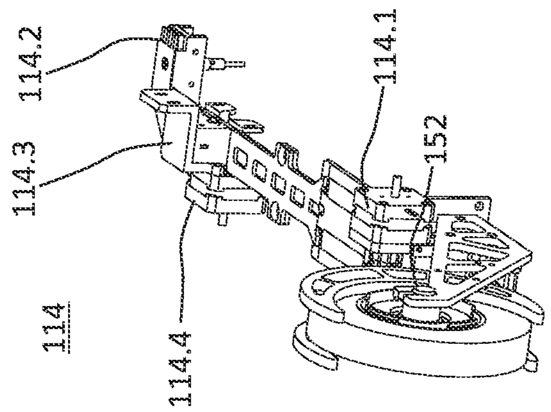
FIG. 16 a perspective view from the side of the foil feed of the embodiment of the transport mechanism of the foil tape with deflection unit of FIG. 14.
Figure 17:
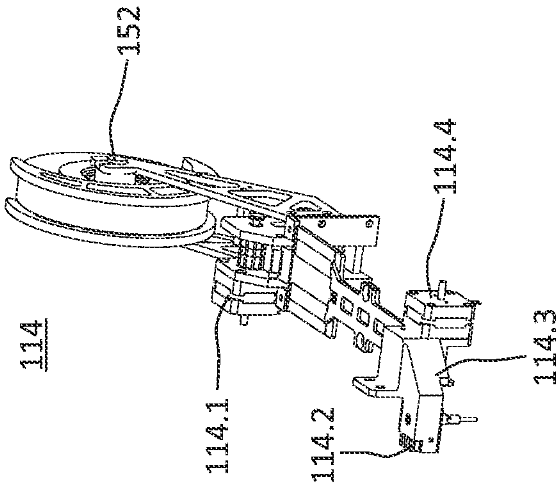
FIG. 17 a perspective view from the side of the conductor feed of the embodiment of the transport mechanism of the foil tape with deflection unit of FIG. 14.

FIG. 14 shows a front view of an embodiment of the transport mechanism 114 of the foil tape 118 with the deflection unit 114.3, which may be used in any embodiment of the device 100. FIG. 15 shows a top view of the embodiment of the transport mechanism 114 of FIG. 14. FIG. 16 shows a perspective view from the foil feed side, i.e. with the unwinder 152 in the foreground, and FIG. 17 shows a perspective view from the conductor feed side, i.e. with the output 114.2 in the foreground.

Figure 18:
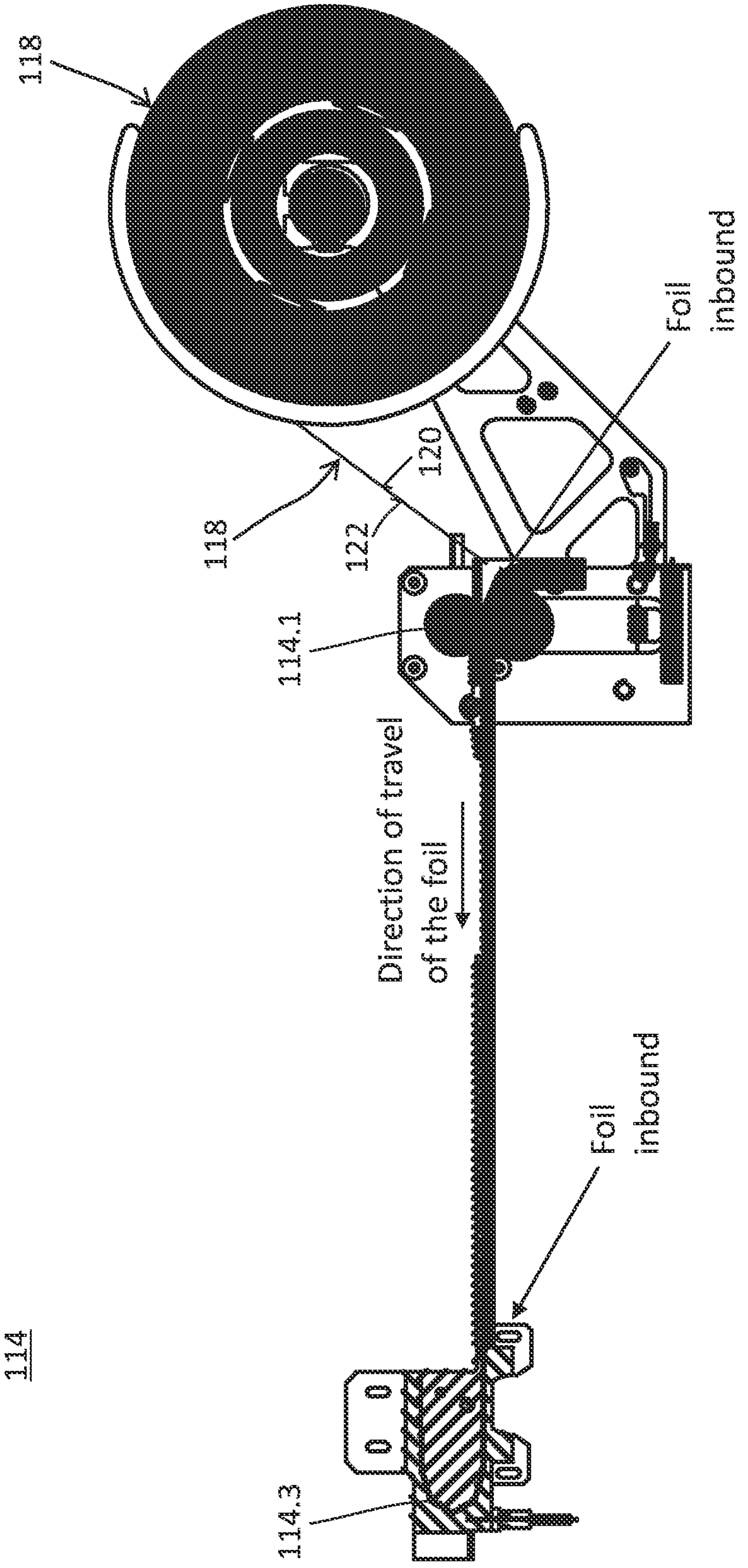
FIG. 18 a sectional view parallel to the longitudinal direction and to the second transverse direction of the embodiment of the transport mechanism of the foil tape with the deflection unit of FIG. 14.

FIG. 18 shows a sectional view parallel to the longitudinal direction 106 and the second transverse direction 126 of the embodiment of the transport mechanism 114. Upstream to the deflection unit 114.3, the printed foil side 122 (or, upstream to the printer 150, the printable foil side 122) is up in FIG. 18. Downstream of the deflection unit 114.3, the printed foil side 122 is at the bottom (which is outside the sectional plane of FIG. 18).

Figure 21:
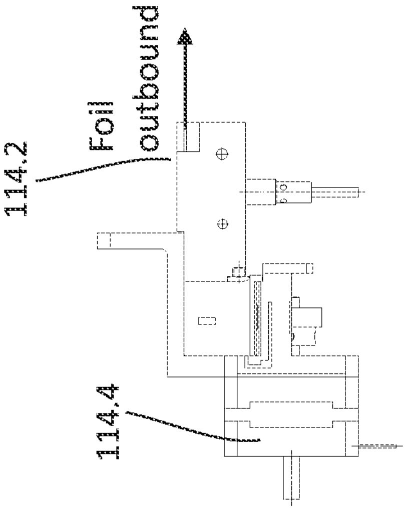
FIG. 21 a side view of the embodiment of the deflection unit of FIG. 19.
Figure 20:
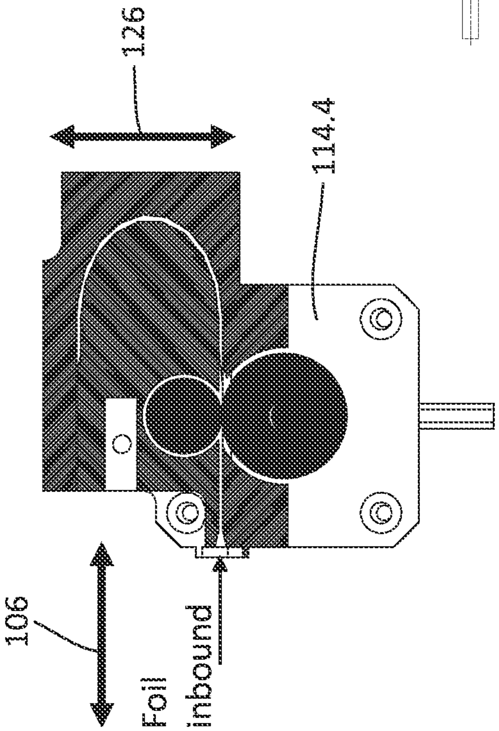
FIG. 20 a sectional view parallel to the longitudinal direction and the second transverse direction of the embodiment of the deflection unit of FIG. 19.
Figure 19:
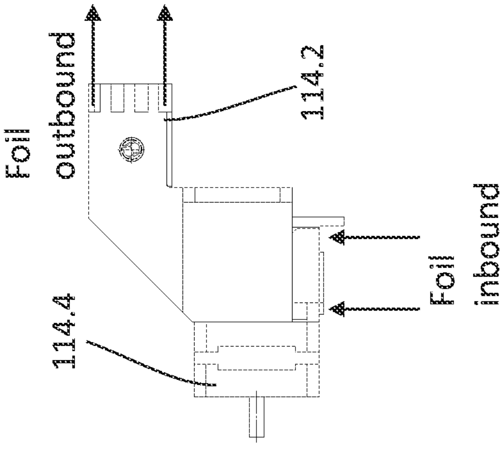
FIG. 19 a top view of an embodiment of the deflection unit, which may be applicable in any embodiment of the device.

FIGS. 19, 20 and 21 show a top view, a sectional view and a side view, respectively, of an embodiment of the deflection unit 114.3, which may be usable in any embodiment of the device 100.

Figure 22:
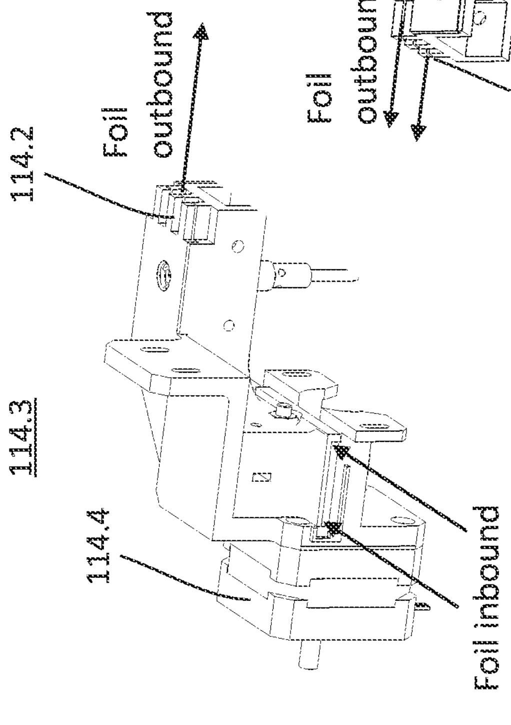
FIGS. 22 to 24 views of the embodiment of the deflection unit of FIG. 19 from different perspectives.
Figure 23:
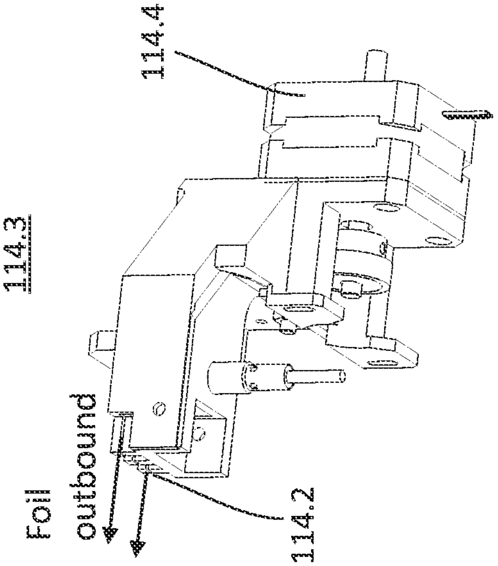
Figure 24:
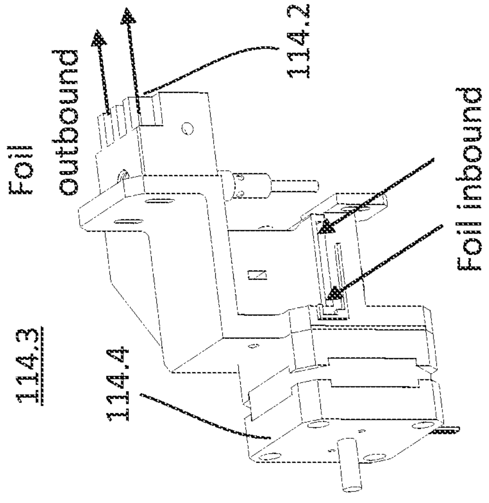

The deflection unit 114.3 is configured to deflect a direction of movement of the foil tape 118 from the longitudinal direction 106 to the first transverse direction 112 without kinking and/or distortion. As shown in FIG. 20, the deflection unit 114.3 comprises a guide channel that curves in a first curved section from a first plane that is parallel to the longitudinal direction 106 and parallel to the first transverse direction 112 into the second transverse direction 126, and that leads to (or opens in) a second curved section in a second plane that is parallel to the first plane and offset in the second transverse direction 126. FIGS. 22 to 24 show views of the embodiment of the deflection unit 114.3 of FIGS. 19 to 21 from different perspectives.

Figure 25:
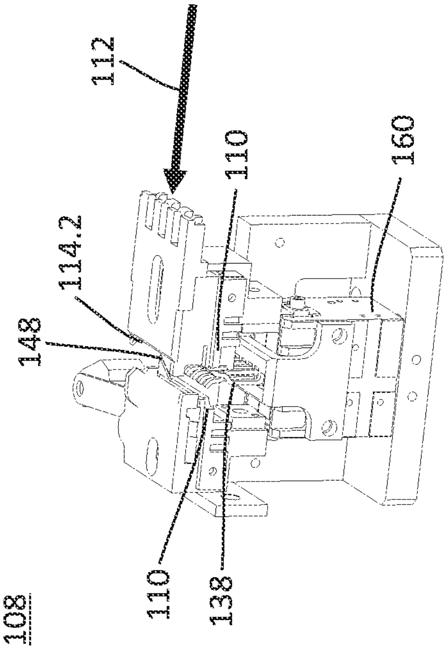
FIG. 25A perspective view of an embodiment of a heating jaw assembly that may be applicable to any embodiment of the device.
Figure 26:
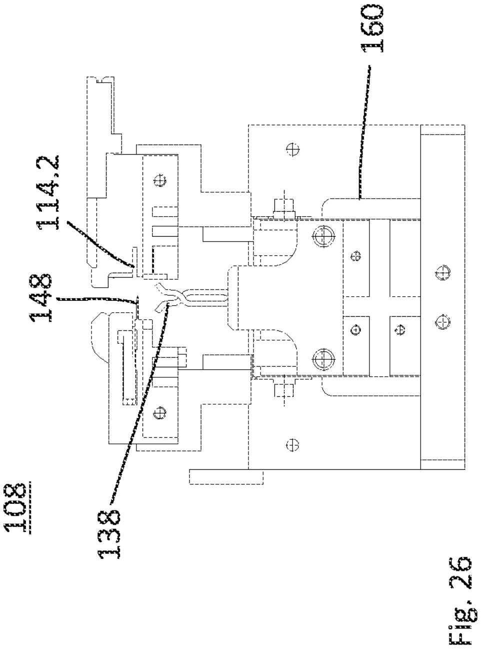
FIG. 26 a front view of the embodiment of the heating jaw assembly of FIG. 25.
Figure 27:
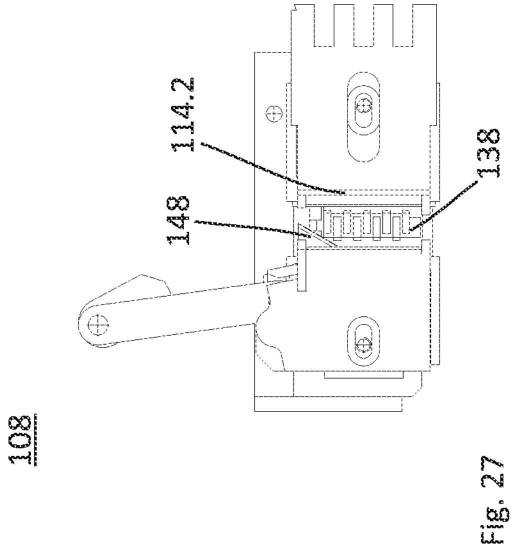
FIG. 27 a top view of the embodiment of the heating jaw assembly of FIG. 25.
Figure 28:
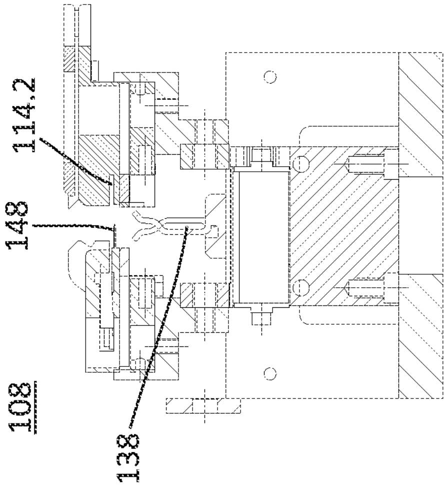
FIG. 28 a sectional view parallel to the first transverse direction and the second transverse direction of the embodiment of the heating jaw assembly of FIG. 25.
Figure 31:
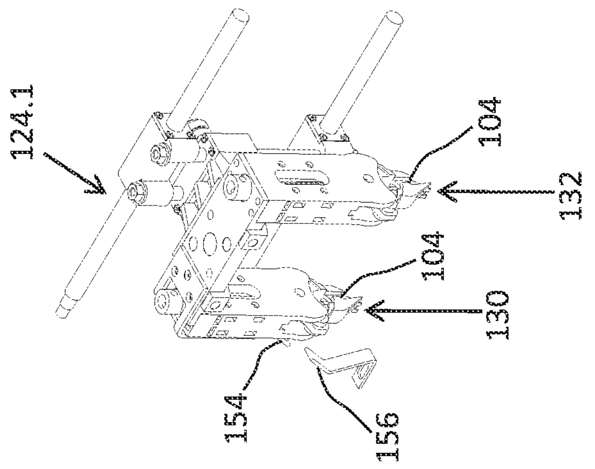
FIG. 31 a second perspective view of the embodiment of the gripper with run-up slant.
Figure 30:
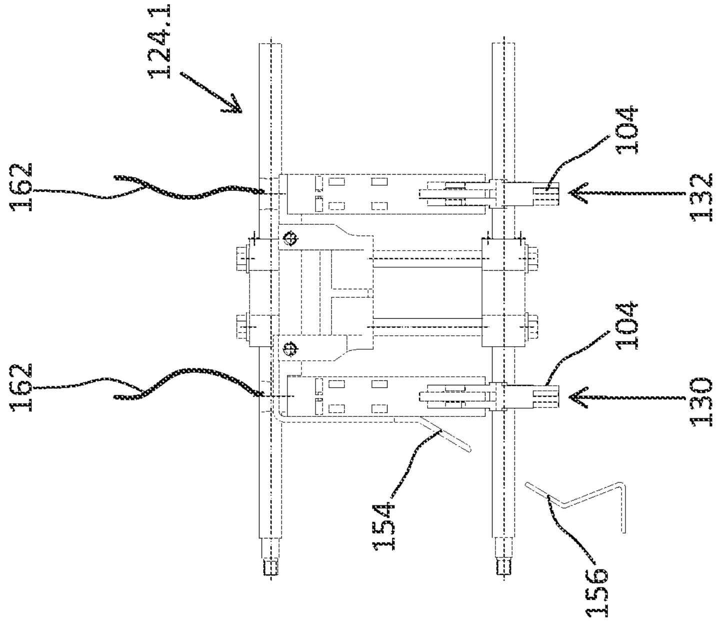
FIG. 30 a side view of the embodiment of the gripper with run-up slant.
Figure 29:
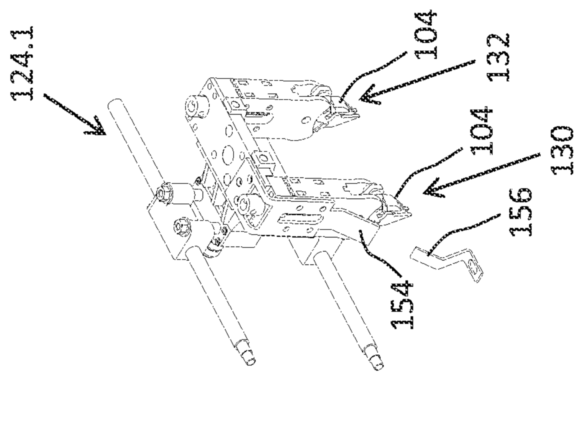
FIG. 29 a first perspective view of an embodiment of the gripper with run-up slant.
Figure 34:
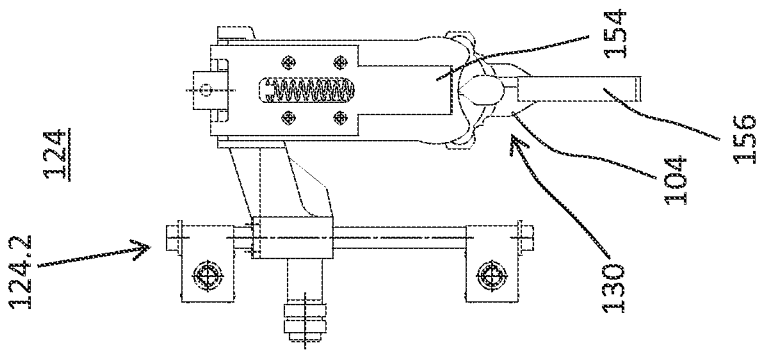
FIG. 34 a side view of the embodiment of the gripper with run-up slant from the side of the run-up slant.
Figure 33:
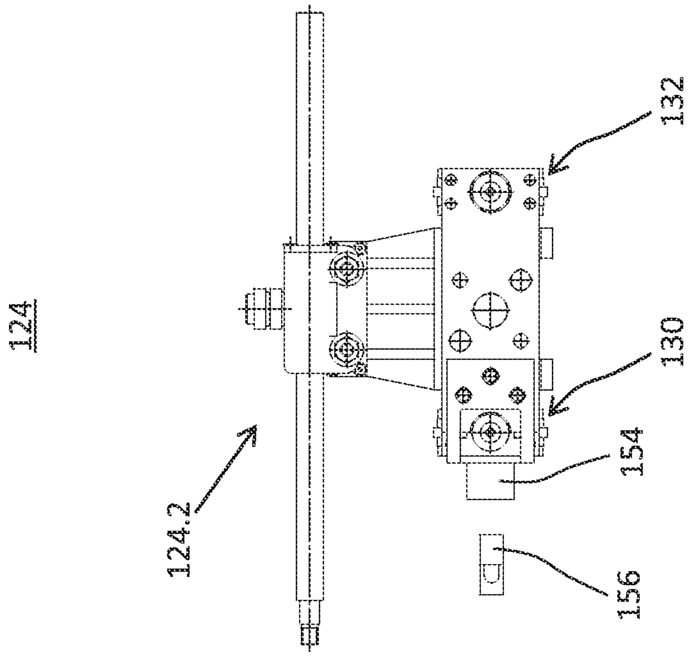
FIG. 33 a top view of the embodiment of the gripper with run-up slant.
Figure 32:
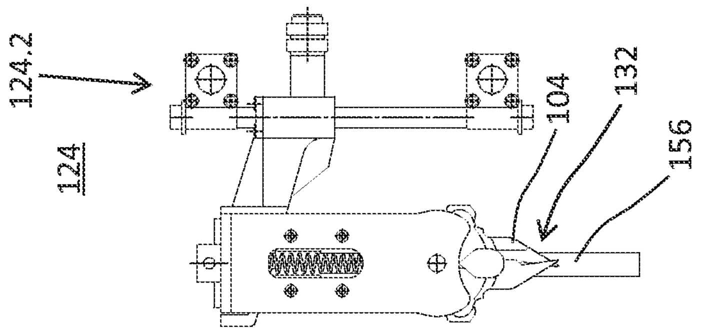
FIG. 32 a side view of the embodiment of the gripper with run-up slant from the side of the conductor feed.
Figure 38:
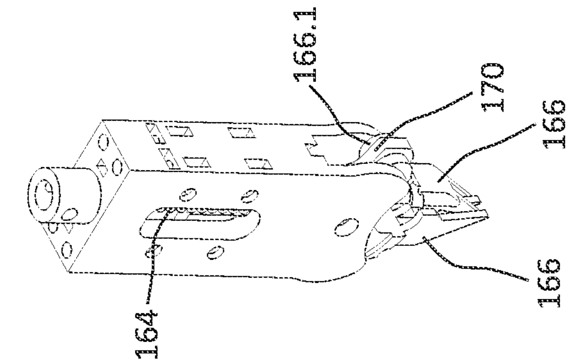
FIG. 38 a perspective view of the embodiment of the gripping section.

FIGS. 25, 26, 27, and 28 show a perspective view, a front view, a top view, and a sectional view, respectively, of an embodiment of the heating jaw assembly 108, which may be usable in any embodiment of the device 100. As shown in FIG. 25, the foil tape 118 is dispensed from the transport mechanism 114 at the first side of the heating jaw assembly 108 in the first transverse direction 112. The heating jaws 110 are linearly movable on a heating jaw carrier 160 between the open position and the closed position.

Figure 39:
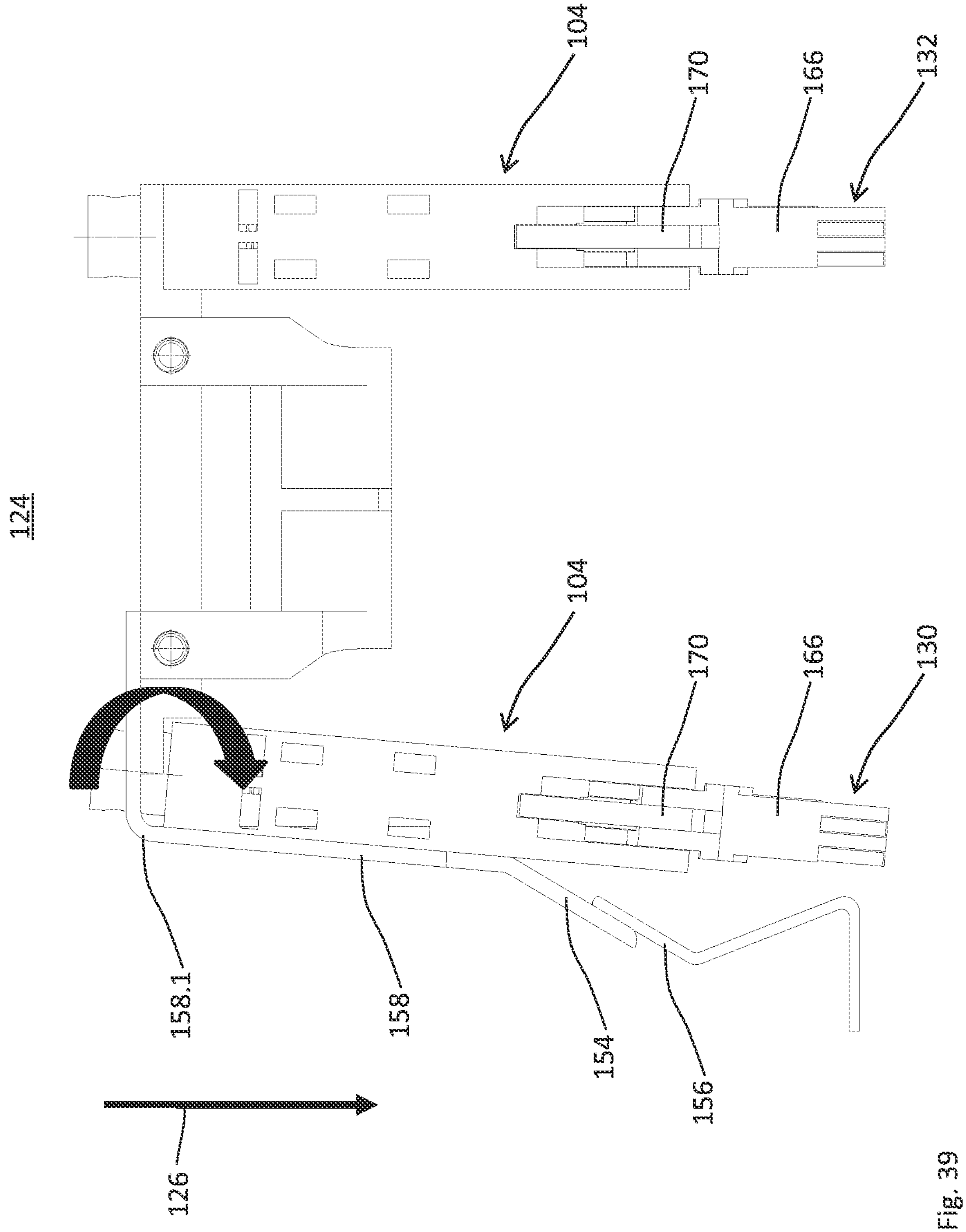
FIG. 39 a front view of the embodiment of the gripper with run-up slant.

FIGS. 29 to 34 show views of an embodiment of the gripper 104 having a first run-up slant 154. As shown in FIG. 39 in a front view of the embodiment of the gripper 104, the first gripping section 130 of the gripper 104 is pivotally mounted for movement in the longitudinal direction 106 and comprises a first run-up slant 154. In the embodiment shown, the device 100 further comprises a second run-up slant 156 arranged to interact with the first run-up slant 154 for pivotal movement of the first gripping section 130 in the longitudinal direction 106 away from the second gripping section 132 when the gripper 104 moves the gripped conductor 102 from the first side 116 of the heating jaw assembly 108 between the two jaws 110 to the second side 128 of the heating jaw assembly 108 in the open position of the heating jaw assembly 108, that is, during the third motion of the gripper 104 along the second transverse direction 126.

Due to the interaction of the run-up slants 154 and 156, the first gripping section 130 of the gripper 104 deflects and increases the distance to the second gripping section 132 compared to the original distance 134. As a result, the gripped conductor 102 remains tensioned during the third motion, for example, against a lateral force of the foil tape 118 wrapped around the conductor 102.

Preferably, the first run-up slant 154 is a free end of a flat spring 158, which comprises a bending point 158.1 at or near the pivot axis of the pivotally mounted first gripping section 130. The interaction of the run-up slants 154 and 156 during the third motion deflects the first gripping section 130 against a tensioning force (or torque) of the flat spring 158.

Due to the flat spring 158, the first gripping section 130 of the gripper 104 returns to the original distance 134.

FIGS. 35, 36, 37, and 38 show a side view, a front view, a sectional view, and a perspective view, respectively, of an embodiment of the first gripping section 130 or the second gripping section 132 of the gripper 104 that may be implementable in any embodiment of the device 100.

Each gripping section 130 and/or 132 comprises two gripper fingers 166 pivotable about a common pivot axis 168. The common pivot axis 168 is parallel to the longitudinal direction 106. The gripper 104 at the first gripping section 130 and/or the second gripping section 132 further comprises a respective driver 170 movable linearly in a cylinder 172. The linear movement of the driver 170 is parallel to the second transverse direction 126. The driver 170 comprises two oblong holes 170.1. An orientation of the oblong holes 170.1 extends predominantly in the first transverse direction 112.

In each of the oblong holes 170.1, a pin 166.1 of one of the two gripper fingers 166 is arranged such that the linear motion of the driver 170 is converted into the pivoting motion of the gripper fingers 166.

The gripper 104 further comprises, at each of the first gripping section 130 and/or the second gripping section 132, a Bowden cable 162 having a pulling cable 162.1 and a cable housing 162.2 for receiving the pulling cable 162.1 in a longitudinally movable manner and which is pressure-resistant in the direction of motion or travel of the pulling cable 162.1.

One end 162.3 of the pulling cable 162 is connected to the driver 170 in a tension-resistant (or tension-proof) manner. The cable housing 162.2 is connected to the cylinder 172 in a pressure-resistant manner or is supported there.

The driver 170 is biased against a pulling direction of the pulling cable 162.1 and/or in the direction of a closed position of the gripper fingers 166 by a return spring 164. Furthermore, the return spring 164 is arranged in the cylinder 172 and the pulling cable 162.1 extends in the return spring 164.

Figure 37:
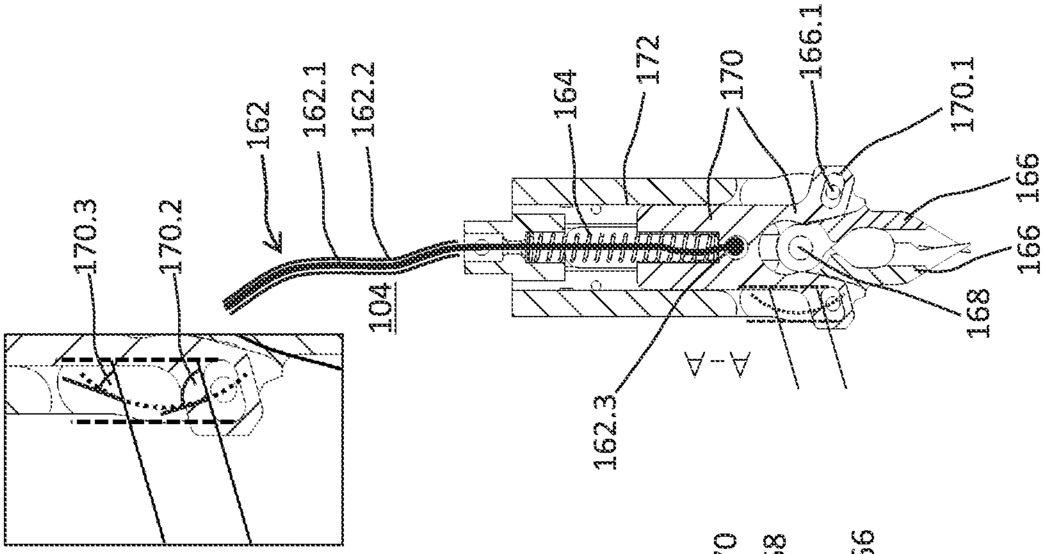
FIG. 37 a sectional view of the embodiment of the gripping section.
Figure 36:
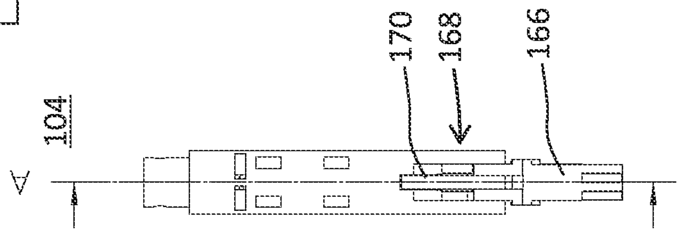
FIG. 36 a front view of the embodiment of the gripping section.
Figure 35:
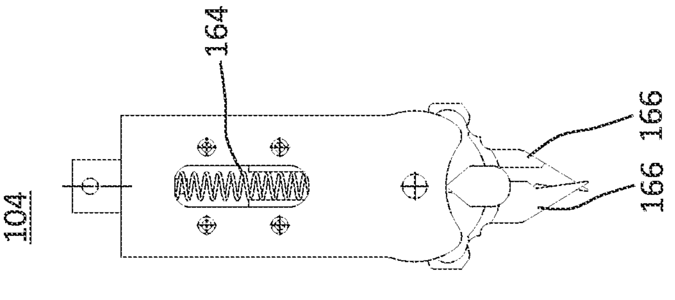
FIG. 35 a side view of an embodiment of a gripping section that may be implementable in any embodiment.

Above FIG. 37 is an enlarged section of FIG. 37. In this, the trajectory of the (exemplary left) pin 166.1 is drawn as a dotted line. An angle 170.3 between the trajectory of each pin 166.1 and the orientation of the oblong hole 170.1 in the open position of the gripper fingers 166 may be between 30° and 60°, preferably about 45°. An angle 170.2 between the trajectory of each pin 166.1 and the orientation of the oblong hole 170.1 in the closed position of the gripper fingers 166 may be between 80° and 100°, preferably 90°.

As a result, translating the linear motion of the driver 170 to the pivoting motion of the gripper fingers 166 may increase the holding force of the gripper fingers 166 in the closed position. This may (for example, as an alternative or additional to the run-up slants 154 and 156) help to ensure that the conductor 102 does not deflect, or does not deflect significantly, when the foil tape 118 is turned over for a wrinkle-free and tight fit of the marking.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

Device 100
Conductor 102
Gripper, preferably radial gripper 104
Actuator of the gripper 104.1
Longitudinal direction 106
Heating jaw assembly, also: welding unit 108
Jaws of the heating jaw assembly 110
First transverse direction transverse to the longitudinal direction 112
Transport mechanics of the foil tape 114
First actuator of transport mechanics 114.1
Output of the foil tape 114.2
Deflection unit of the transport mechanism 114.3
Second actuator of the transport mechanism 114.4
First side of the heating jaw assembly 116
Foil tape, also: foil 118
Heat-weldable foil side of the foil tape or foil side facing away from the heating jaw assembly 120
Foil side of foil tape comprising marking or foil side facing the heating jaw assembly 122
Gripper mechanism 124
Actuator of the gripper mechanism 124.1
Guide of the gripper mechanism, preferably in a plane 124.2
Second transverse direction transverse to the longitudinal direction and transverse to the first transverse direction 126
Second side of the heating jaw assembly 128
First gripping section of the gripper 130
Second gripping section of the gripper 132
Distance between first and second gripping sections 134
Width of the heating jaw assembly in the longitudinal direction 136
Support spring 138
Motion guide 140
Guide groove of the motion guide 142
Roller of the motion guide 144
Pivot drive of the motion guide 146
Cutting unit, also: separating unit or severing blade 148
Actuator of the cutting unit 148.1
Printer, preferably thermal transfer printer 150
Unwinder of the foil tape 152
First run-up slant, preferably free end of the flat spring 154
Second run-up slant, preferably stationary rail 156
Flat spring 158
Bending point of flat spring 158.1
Heating jaw carrier 160
Cable control of the gripper, preferably Bowden cable 162
Pulling cable, preferably Bowden cable 162.1
Cable housing of Bowden cable 162.2
End of the pulling cable 162.3
Return spring of the gripper 164
Gripper finger of the gripper 166
Pin of the gripper finger 166.1
Common pivot axis of the swivel-mounted gripper fingers 168
Driver or entrainer 170
Oblong hole in the driver 170.1
Angle in open position of gripper 170.2
Angle in closed position of gripper 170.3
Cylinder 172
Further gripper 174

The invention claimed is:

1. A device for marking a conductor, comprising:

a gripper configured to grip the conductor extending in a longitudinal direction;

a heating jaw assembly having two jaws spaced from each other in an open position in a first transverse direction transverse to the longitudinal direction; and a transport mechanism for dispensing a foil tape extending along the first transverse direction on a first side of the heating jaw assembly, a foil side of the foil tape facing away from the heating jaw assembly being weldable by heat and a foil side of the foil tape facing the heating jaw assembly comprising a marking of the conductor; and a gripper mechanism configured to move the gripper along a second transverse direction transverse to the longitudinal direction and transverse to the first transverse direction when the heating jaw assembly is in the open position, wherein the gripper is configured to move the gripped conductor from the first side of the heating jaw assembly between the two jaws while entraining the foil tape abutting the conductor to a second side of the heating jaw assembly, the second side being opposite the first side, wherein the two jaws in a closed position are configured to exert pressure on each other in the first transverse direction and to emit heat, and wherein portions of the weldable foil side of the foil tape are brought into abutment with each other or configured to abut each other under a pressure of the jaws such that a heat of the jaws welds portions for arranging the foil tape having the marking around the conductor in a circumferentially closed manner.

2. The device of claim 1, wherein the gripper comprises a first gripping section and a second gripping section spaced from the first gripping section in the longitudinal direction of the conductor.

3. The device of claim 2, wherein a distance between the first gripping section and the second gripping section is greater than a width of the heating jaw assembly in the longitudinal direction, wherein the gripper mechanism is configured to move the gripped conductor from the first side of the heating jaw assembly to the second side of the heating jaw assembly, and wherein the first gripping section and the second gripping section bypass the heating jaw assembly on an outside on opposite sides of the heating jaw assembly, respectively.

4. The device of claim 2, wherein the first gripping section of the gripper is supported movably in the longitudinal direction and comprises a first run-up slant, and wherein the device further comprises a second run-up slant arranged to interact with the first run-up slant for moving the first gripping section in the longitudinal direction away from the second gripping section when the gripper moves the gripped conductor from the first side of the heating jaw assembly between the two jaws to the second side of the heating jaw assembly in the open position of the heating jaw assembly.

5. The device of claim 4, wherein the first gripping section of the gripper is supported pivotally in the longitudinal direction, and wherein the second run-up slant is arranged to interact with the first run-up slant for moving the first gripping section in the longitudinal direction away from the second gripping section when the gripper moves the gripped conductor from the first side of the heating jaw assembly between the two jaws to the second side of the heating jaw assembly in the open position of the heating jaw assembly during a third motion of the gripper along the second transverse direction.

6. The device of claim 2, wherein the gripper comprises, at the first gripping section and/or the second gripping section, respectively:

two gripper fingers pivotally movable about a common pivot axis.

7. The device of claim 6, wherein the gripper at the first gripping section and/or the second gripping section further comprises, respectively:

a driver linearly movable in a cylinder, wherein the driver comprises two oblong holes; and wherein in each of the oblong holes, a pin of one of the gripper fingers is arranged to convert the linear movement of the driver into the pivoting movement of the gripper fingers.

8. The device of claim 7, wherein the gripper at the first gripping section and/or the second gripping section further comprises, respectively:

a cable with a pulling cable and a cable housing which receives the pulling cable in a longitudinally movable manner and which is pressure-resistant in a direction of motion of the pulling cable, wherein one end of the pulling cable is connected in a tension-resistant manner to the driver and the cable housing is supported in a pressure-resistant manner on the cylinder.

9. The device of claim 6, wherein an angle between a trajectory of each pin and an orientation of an oblong hole in an open position of the two gripper fingers is between 30° and 60°, and/or wherein the angle between the trajectory of each pin and the orientation of the oblong hole in a closed position of the gripper fingers is between 80° and 100°.

10. The device of claim 1, further comprising:

a support spring arranged on the second side of the heating jaw assembly for pressing the foil tape wrapped around the conductor against the conductor.

11. The device of claim 1, wherein the gripper mechanism comprises a mechanical guide configured to guide the gripper in a plane that is parallel to the longitudinal direction and to the second transverse direction, and/or that is perpendicular to the first transverse direction.

12. The device of claim 11, wherein the gripper mechanism comprises a motion guide configured to determine a path of the gripper.

13. The device of claim 12, wherein the path comprises a sequence of motions comprising:

a first motion along the second transverse direction away from the heating jaw assembly; and/or a second motion along the longitudinal direction toward the heating jaw assembly; and/or a third motion along the second transverse direction toward the heating jaw assembly, which comprises a motion in which the gripper moves the gripped conductor from the first side of the heating jaw assembly between the two jaws to the second side of the heating jaw assembly in the open position of the heating jaw assembly.

14. The device of claim 13, wherein the gripper is configured to:

pick up the conductor to be marked before at least one motion of the sequence of motions; and/or traverse the path in reversal of the sequence of motions and/or to release the marked conductor after the reversal of the first motion.

15. The device of claim 12, wherein the motion guide is configured to determine the path of the gripper in the plane.

16. The device of claim 1, further comprising:

a cutting unit arranged on a first side of the heating jaw assembly to cut the welded sections flush.

17. The device of claim 1, wherein the transport mechanism of the foil tape further comprises a deflection unit configured to deflect a direction of movement of the foil tape from the longitudinal direction to the first transverse direction without kinking and/or distortion.

18. The device of claim 17, further comprising:

a printer arranged along the transport mechanism between an unwinder of the foil tape and the deflection unit for printing the marking of the conductor on the foil side of the foil tape facing the heating jaw assembly.

19. The device of claim 1, wherein the transport mechanism of the foil tape further comprises a deflection unit having a guide channel that is curved in a first curved portion from a first plane, which is parallel to the longitudinal direction and parallel to the first transverse direction into the second transverse direction, and that leads in a second curved portion into a second plane that is parallel to the first plane and offset in the second transverse direction.

20. The device of claim 2, wherein each of the gripping sections is configured to grip the conductor transversely to the longitudinal direction of the conductor.

* * * * *